US006957202B2

(12) United States Patent (10) Patent No.: US 6,957,202 B2
Skaanning et al. (45) Date of Patent: Oct. 18, 2005

(54) MODEL SELECTION FOR DECISION SUPPORT SYSTEMS

(75) Inventors: Claus Skaanning, Dronninglund (DK); James Schreckengast, Fort Collins, CO (US)

(73) Assignee: Hewlett-Packard Development Company L.P., Houston, TX (US)

( * ) Notice: Subject to any disclaimer, the term of this patent is extended or adjusted under 35 U.S.C. 154(b) by 725 days.

(21) Appl. No.: 09/866,411

(22) Filed: May 26, 2001

(65) Prior Publication Data

US 2002/0183988 A1 Dec. 5, 2002

(51) Int. Cl.[7] .............................................. G06N 5/00
(52) U.S. Cl. .............................. 706/20; 706/55; 700/29
(58) Field of Search .................... 365/185.33; 382/190; 700/29; 702/2; 706/20, 55, 16, 25, 45, 46, 47, 48, 26, 925; 705/35, 36, 37

(56) References Cited

U.S. PATENT DOCUMENTS

| 5,764,515 | A  | * | 6/1998 | Guerillot et al. ................ 702/2 |
| 6,266,442 | B1 | * | 7/2001 | Laumeyer et al. .......... 382/190 |
| 6,345,001 | B1 | * | 2/2002 | Mokhlesi ................ 365/185.33 |
| 6,535,865 | B1 | * | 3/2003 | Skaaning et al. ............. 706/52 |
| 6,591,146 | B1 | * | 7/2003 | Pavlovic et al. ............... 700/29 |
| 6,618,716 | B1 | * | 9/2003 | Horvitz ........................ 706/55 |
| 6,678,669 | B2 | * | 1/2004 | Lapointe et al. .............. 706/15 |
| 2002/0128943 | A1 | * | 9/2002 | Schreckengast et al. ...... 705/36 |

OTHER PUBLICATIONS

Clemons, "Evolution of Strategic Investments in Information Technology", Communications of the ACM, Jan. 1991, vol. 34, Iss 1, pp. 22–36.*

Konana et al., "The Implications of Online Investing", Communications of the ACM, Jan. 2000, vol. 43, Iss 1, pp. 34–41.*

Tseng et al., "Sensitive Sequential Myopic Information Gathering", HICSS, retrieved from the Internet: http://citeseer.ist.psu.edu/96112.html.*

Pennock et al., "Toward a Market Model for Bayesian Inference", Proceedings of the 12th Conference on AI, Aug. 1996, pp. 405–413.*

Moses, "A Consideration of the Impact of Interactions with Module Effects on the Direct Measurement of Subjective Software Attributes", Proceedings–7th International Software Metrics Symposium, Apr. 2001, pp. 112–123.*

Scheerer et al., "Expert System Tools for Describing and Predicting the Coastal Ocean Environment", Proceedings–Oceans Engineering for Today's Technology and Tomorrow's Preservation, Sep. 1994, vol. 2, pp. II/11–II/16.*

Wilkins et al., "Collaborative Decision Making and Intelligent Reasoning in Judge Advisory Systems", Proceedings of the 32nd Hawaii International Conference on System Sciences, Jan. 1999.*

(Continued)

*Primary Examiner*—Wilbert L. Starks, Jr.

(57) ABSTRACT

Model selection is performed. First information is obtained from a user about a presenting issue. The first information is used within a supermodel to identify an underlying issue and an associated sub model for providing a solution to the underlying issue. A Bayesian network structure is used to identify the underlying issue and the associated sub model. The sub model obtains additional information about the underlying issue from the user. The sub model uses the additional information to identify a solution to the underlying issue.

7 Claims, 6 Drawing Sheets

OTHER PUBLICATIONS

Bargar et al., "Sonification of Probabilistic Belief Networks", 1998 IEEE International Conference on Systems, Man and Cybernetics, Oct. 1998, vol. 1, pp. 1020–1025.*

Neil et al., "Using Bayesian Belief Networks to Predict the Reliability of Military Vehicles", Computing and Control Engineering Journal, Feb. 2001.*

Ogunyemi et al., "Probabilistically Predicting Penetrating Injury for Decision Support", Proceedings of the 11th IEEE Symposium on Computer–Based Medical Systems, Jun. 1998, pp. 44–49.*

Gerevini et al., "Modeling the Treatment Scheme of Sustained Ventricular Tachycardia with a Bayesian Belief Network", Sep. 1990, pp. 585–588.*

Gur–Ali et al., "Induction of Rules Subject to a Quality Constraint: Probabilistic Inductive Learning", IEEE Transactions on Knowledge and Data Engineering, Dec. 1993, vol. 5, Iss 6, pp. 979–984.*

Elomaa et al., "On Inducing Topologically Minimal Decision Trees", Proceedings of the 2nd International IEEE Conference on Tools for AI, Nov. 1990, pp. 746–752.*

Bradley et al., "On the Methodology for Comparing Learning Algorithms: A Case Study", Proceedings of the 1994 2nd Australia and New Zealand Conference on Intelligent Information Systems, Nov. 1994, pp. 37–41.*

Bandar et al., "An Optimised Decision Tree Induction Algorithm for Real World Data Domains", Proceedings–6th International Conference on Neural Information Processing, Nov. 1999, vol. 2, pp. 441–446.*

Baba et al., "Application of Techniques of Computational Intelligence for Constructing Reliable Decision Support Systems", International Joint Conference on Neural Networks, Jul. 1999, vol. 6, pp. 3856–3859.*

Baba et al., "A User Friendly Decision Support System for Dealing Stocks Using Neural Network", Proceedings of the 1993 International Joint Conference on Neural Networks, Oct. 1993, vol. 1, pp. 762–765.*

Green et al., "Artificial Intelligence in Financial Markets", IEEE International Conference on Neural Networks, Nov. 1995, vol. 2, pp. 839–844.*

Glelzes et al., "An Adaptive Multi–Agent Tool for Electronic Commerce", Proceedings–IEEE 9th International Workshops on Enabling Technologies, Jun. 2000, pp. 59–66.*

Kandt et al., "A Financial Investment Assistant", Proceedings of the 21st Annual Hawaii International Conference on System Sciences, Jan. 1988, vol. 3, pp. 510–517.*

Kosaka et al., "Applications of Fuzzy Logic/Neural Network to Securities Trading Decision Support System", 1991 IEEE International Conference on Systems, Man and Cybernetics, Oct. 1991, vol. 3, pp. 1913–1918.*

Li et al., "Investment Decision Making Using FGP: A Case Study", Proceedings of the 1999 Congress on Evolutionary Computation, Jul. 1999, vol. 2.*

Omes et al., "A Neural Network that Explains as Well as Predicts Financial Market Behavior", Proceedings of the IEEE/IAFE 1997 Computational Intelligence for Financial Engineering, Mar. 1997, pp. 43–49.*

Wang et al., "Dynamic Trading Decision Support System Using Rule Selector Based on Genetic Algorithms", Proceedings of th 1996 IEEE Signal Processing Society Workshop on Neural Networks for Signal Processing, Sep. 1996, pp. 119–128.*

Wang et al., "Stock Trading Decision Support System Using a Rule Selector Based on Sliding on Window", 1997 IEEE Internation Conference on Systems, Man and Cybernetics, Oct. 1997, vol. 1, pp. 559–564.*

Hiemstra, "A Stock market Forecasting Support System Based on Fuzzy Logic", Proceedings of the 27th Annual Hawaii International Conference on System Sciences, Jan. 1994, vol. 3, pp. 281–287.*

Chou et al., "A Rule–Based Neural Stock Trading Decision Support System", Proceedings of the IEEE/IAFE 1996 Conference o Computational Intelligence for Financial Engineering, Mar. 1996, pp. 148–154.*

Baba et al., "Utilization of Neural Network for Constructing a User Friendly Decision Support System to Deal Stocks", IEEE International Conference on Neural Networks, Nov. 1995, vol. 2, pp. 818–823.*

Moon et al., "An Intelligent Decision Support System for Stock Investment", 4th IEEE Region 10 International Conference, Nov. 1989, pp. 956–959.* de Kleer, J. and Williams, B., "Diagnosing multiple faults" in *Artificial Intelligence*, 32:97–130 (1987).

Heckerman, D., Breese, J. and Rommelse, K., "Decision–theoretic Troubleshooting," in *Communications of the ACM*, 38:49–57 (1995).

Lauritzen, S.L., and Spiegelhalter, D.J., "Local Computations with Probabilities on Graphical Structures and their Applications to Expert Systems," in *Journal of the Royal Statistical Society, Series B*, 50(2): 157–224 (1988).

Jensen, F.V., Lauritzen, S. L., and Olesen, K.G., "Bayesian Updating in Causal Probabilistic Networks by Local Computations,"in *Computational Statistics Quarterly*, 4:269–282, (1990).

Breese, J.S. and Heckerman, D. "Decision–theoretic Troubleshooting: A Framework for Repair and Experiment", *Technical Report MSR–TR–96–06*, Microsoft Research, Advanced Technology Division, Microsoft Corporation, Redmond, USA (1996).

Henrion, M., Pradhan, M., delFavero, B., Huang, K., Provan, G., and O=Rorke, P., "Why is Diagnosis using Belief Networks Insentive to Imprecision in Probabilities?", *Proceedings of the Twelfth Conference on Uncertainty in Artificial Intelligence*, (1996).

* cited by examiner

MODEL SELECTION FOR DECISION SUPPORT SYSTEMS

RELATED APPLICATIONS

The subject matter of the present patent application is related to the subject matter set out by Claus Skaanning, Uffe Kjaerulff and Finn V. Jensen in a co-pending patent application Ser. No. 09/261,769, filed on Mar. 3, 1999 for A METHOD FOR KNOWLEDGE ACQUISITION FOR DIAGNOSTIC BAYESIAN NETWORKS, to the subject matter set out by Claus Skaanning, Finn V. Jensen, Uffe Kjaerulff, Paul A. Pelletier, Lasse Rostrup Jensen, Marilyn A. Parker and Janice L. Bogorad in co-pending patent application Ser. No. 09/353,727, filed on Jul. 14, 1999 for AUTOMATED DIAGNOSIS OF PRINTER SYSTEMS USING BAYESIAN NETWORKS, and to the subject matter set out by Claus Skaanning in co-pending patent application Ser. No. 09/388,891, filed on Sep. 2, 1999 for AUTHORING TOOL FOR BAYESIAN NETWORK TROUBLESHOOTERS.

BACKGROUND

The present invention pertains to probabilistic troubleshooters and diagnostic systems and pertains particularly to model selection for decision support systems.

Decision support systems are defined as capturing systems for diagnosis, troubleshooting, selection, classification, prediction and general decision support.

Currently, it is highly expensive for manufacturers to diagnose the systems of their customers. Automation of this process has been attempted using probabilistic troubleshooters and other diagnostic systems. Some of these systems are based on Bayesian networks.

One troubleshooter based on Bayesian networks is described by Heckerman, D., Breese, J., and Rommelse, K. (1995), *Decision-theoretic Troubleshooting, Communications of the ACM,* 38:49–57 (herein "Heckerman et al. 1995").

In scientific literature Bayesian networks are referred to by various names: Bayes nets, causal probabilistic networks, Bayesian belief networks or simply belief networks. Loosely defined Bayesian networks are a concise (acyclic) graphical structure for modeling probabilistic relationships among discrete random variables. Bayesian networks are used to efficiently model problem domains containing uncertainty in some manner and therein lies their utility. Since they can be easily modeled on a computer, they are the subject of increasing interest and use in automated decision-support systems, whether for medical diagnosis, automated automotive troubleshooting, economic or stock market forecasting or in other areas as mundane as predicting a computer user's likely requirements.

In general, a Bayesian network consists of a set of nodes representing discrete-valued variables connected by arcs representing the causal dependencies between the nodes. A set of conditional probability tables, one for each node, defines the dependency between the nodes and its parents. And, nodes without parents, sometimes called source nodes, have associated therewith a prior marginal probability table. For specific applications the data for the probability tables for all other nodes are provided by what is termed domain experts in whatever field is being modeled. This involves assigning prior probabilities for all nodes without parents, and conditional probabilities for all nodes with parents. In diagnostic Bayesian networks nodes can represent causes, or outcomes of actions and questions. In very large diagnostic Bayesian networks, most of the events are very rare with probabilities in the range of 0.001 to 0.000001. But, since a primary goal of a computer decision support system is to provide decisions as accurate as is possible, it is imperative that the domain experts provide probabilistic information that is highly reliable and their best estimate of the situation.

Bayesian networks provide a way to model problem areas using probability theory. The Bayesian network representation of a problem can be used to provide information on a subset of variables given information on others. A Bayesian network consists of a set of variables (nodes) and a set of directed edges (connections between variables). Each variable has a set of mutually exclusive states. The variables together with the directed edges form a directed acyclic graph (DAG). For each variable $v$ with parents $w1, \ldots, w_n$, there is defined a conditional probability table $P(v|w_1, \ldots, w_n)$. Obviously, if v has no parents, this table reduces to the marginal probability $P(v)$.

Bayesian networks have been used in many application domains with uncertainty, such as medical diagnosis, pedigree analysis, planning, debt detection, bottleneck detection, etc. However, one of the major application areas has been diagnosis. Diagnosis (i.e., underlying factors that cause diseases/malfunctions that again cause symptoms) lends itself nicely to the modeling techniques of Bayesian networks.

Model selection is the ability to aid a user of a diagnostic system in determining the correct model for handling a problem or helping the user reach a decision.

Menu based selection of models can incorporate a tree of models in menus and submenus. This provides a user with an overview of the available models, however, it can be difficult to find the correct model in a large tree of models. Also, it may not be possible for an inexperienced user to identify the correct model. For example, "Bubble print" is a clearly defined print quality problem on printers; however, only expert users will be able to classify an obscure print quality problem as "Bubble print".

Text search selection of models operate by using text search within sub models to determine which sub model to use. Text searching occasionally allows short cutting directly to the desired model, however, if the description of the problem is unknown to the user (e.g., "Bubble print"), the user will be unable to supply a good text to find the best model.

Case based systems can be used for model selection as such case based systems are intended to help users identify problems by asking a sequence of questions. Case based systems for model selection do, however, suffer from the same problems as all other case based systems. Constructing a case base system requires a detailed technical knowledge of cased based systems as the performance of the system is very dependent on the quality of cases used for inference.

SUMMARY OF THE INVENTION

In accordance with a preferred embodiment of the present invention, model selection is performed. First information is obtained from a user about a presenting problem. The first information is used within a supermodel to identify an underlying problem and an associated sub model for providing a solution to the underlying problem. A Bayesian network structure is used to identify the underlying problem and the associated sub model. The sub model obtains additional diagnostic information about the underlying problem from the user. The sub model uses the diagnostic information to identify a solution to the underlying problem.

DESCRIPTION OF THE PREFERRED EMBODIMENT

The present invention is useful for model selection. For example, the preferred embodiment of the present invention is useful to select any model or system that can do the following: (1) generate a probability of one or more problems (also known as diagnoses or causes); (2) generate a next question or test; and (3) generate a probability of each possible answer of that next question or test, given the information known to the system.

While the preferred embodiment of the present invention applies to any model or system that can perform the above listed functions, a Bayesian network diagnostic system is used in description of a particular embodiment of the invention. Selected models do not have be Bayesian networks but can be another type of system, for example, case based systems, fuzzy systems, rule based systems, etc.

Below, the preferred embodiment is described for selecting among sub models in a diagnostic environment. However, as will be understood by persons of ordinary skill in the art, the teaching of the present invention is sufficient to use the invention in a variety of application areas such as, for example, decision support, selection, classification, prediction, brokering. One example of brokering is the brokering of stocks in companies.

Figure 1:
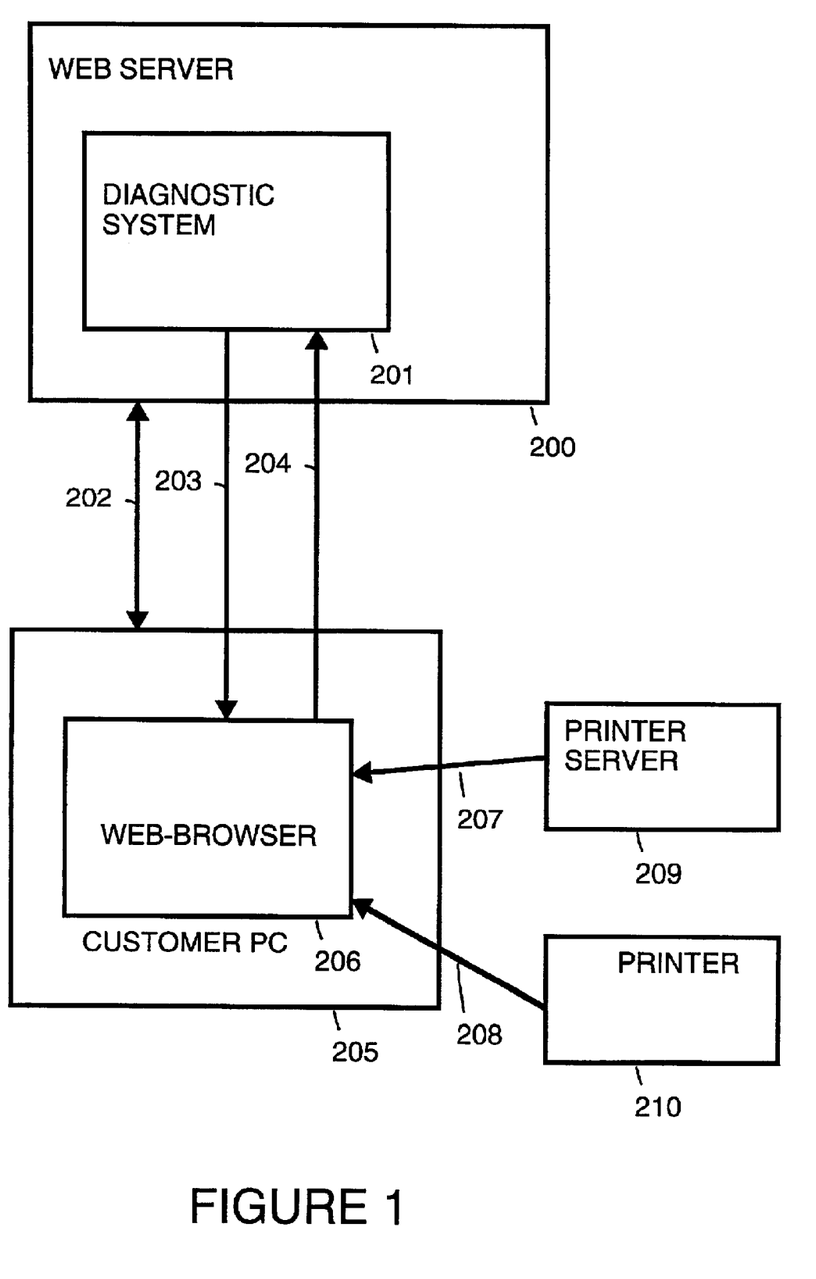
FIG. 1 is an overview of a diagnostic environment.

FIG. 1 is an overview of a diagnostic environment. FIG. 1 shows a web-server 200, a customer personal computer (PC) 205, a printer server 209 and a printer 210. A printer system diagnostic system 201 runs on a web-server 200.

A diagnostic system is used, for example, for decision support, selection, classification, prediction, and or brokering. In decision support, a user is taken through a sequence of questions leading him to the optimal solution to a problem. For example, decision support aids a user in making the right decision with regard to some problem. For example, a system for automated customer support operations (SACSO) decision support engine uses a sequence of questions to determine the true underlying problem, and can then suggests solutions to the problem.

To perform knowledge acquisition used to provide decision support, a domain in which to carry out the decision support is identified. Also identified are possible situations within the domain, possible sub-situations of the possible selections and informational steps. The informational steps are matched to the possible situations and the possible sub-situations. Probabilities are estimated for the possible situations the possible sub-situations. Also estimated are probabilities for actions and questions set out in the informational steps and costs for actions and questions set out in the informational steps.

In selection, a diagnostic system runs through a sequence of questions that aids the user in selecting between a number of possibilities. Multiple selections can be made. For example, a student uses the diagnostic system to design an optimal curriculum of classes. By asking him questions, the diagnostic system attempts to determine the areas where the student needs training (skills gap analysis), and the diagnostic system can then suggest classes that target these specific areas. This is not completely general decision support. It is decision support in the manner that it aids the user to identify the situation that the use is looking at, and then suggests a solution. Causes correspond to situations. Informational steps correspond to diagnostic steps. In this case actions provide solutions, and questions gather information like in a diagnostic system.

To perform knowledge acquisition used to provide selection, a domain in which to carry out the selection is identified. Also identified are possible situations within the domain, possible sub-situations of the possible selections and informational steps. The informational steps are matched to the possible situations and the possible sub-situations. Probabilities are estimated for the possible situations the possible sub-situations. Also estimated are probabilities for actions and questions set out in the informational steps and costs for actions and questions set out in the informational steps. Causes correspond to selections. Informational steps correspond to diagnostic steps and are used to gather information useful for narrowing in on a selection.

In classification, a diagnostic system can be used to classify something according to a number of categories. For example, the diagnostic system can be used for path analysis, e.g., directing customer feedback e-mails to the correct person. Directing customer feedback e-mails to the correct person could entail, for example, classifying an e-mail into one of a number of categories, based on tags or keywords extracted from the e-mail.

In prediction, a diagnostic system can be used to create predictive systems. Basically, potential future causes are modeled instead of current causes, and questions that look for symptoms of future problems are modeled.

Brokering is a variant of selection where a diagnostic system is used to broker among a list of possible solutions. For example, an e-speak broker that needs to perform a more intelligent brokering between competing e-services can use a diagnostic system to do this by carrying out a more intelligent comparison of e-service parameters.

Printer diagnostic system 201 is used herein as an example of a diagnostic system. Printer diagnostic system 201 is used for diagnosing operation of a printing system. A user on customer PC 205 can access diagnostic system 201 over Internet 202. A web-browser 206 within customer PC 205 is used to access web-server 200. In response to the customer's interaction with diagnostic system 201, diagnostic system 201 responds with suggestions 203 for diagnostic steps that the customer can perform. Diagnostic system 201 essentially functions as an expert system that utilizes artificial intelligence. The customer provides information 204 back to diagnostic system 201 which informs diagnostic system 201 on the outcome from acting on suggestions 203. Information 204 may include information 207 the customer obtains from printer server 209 and/or information 208 the customer obtains from printer 210.

Figure 2:
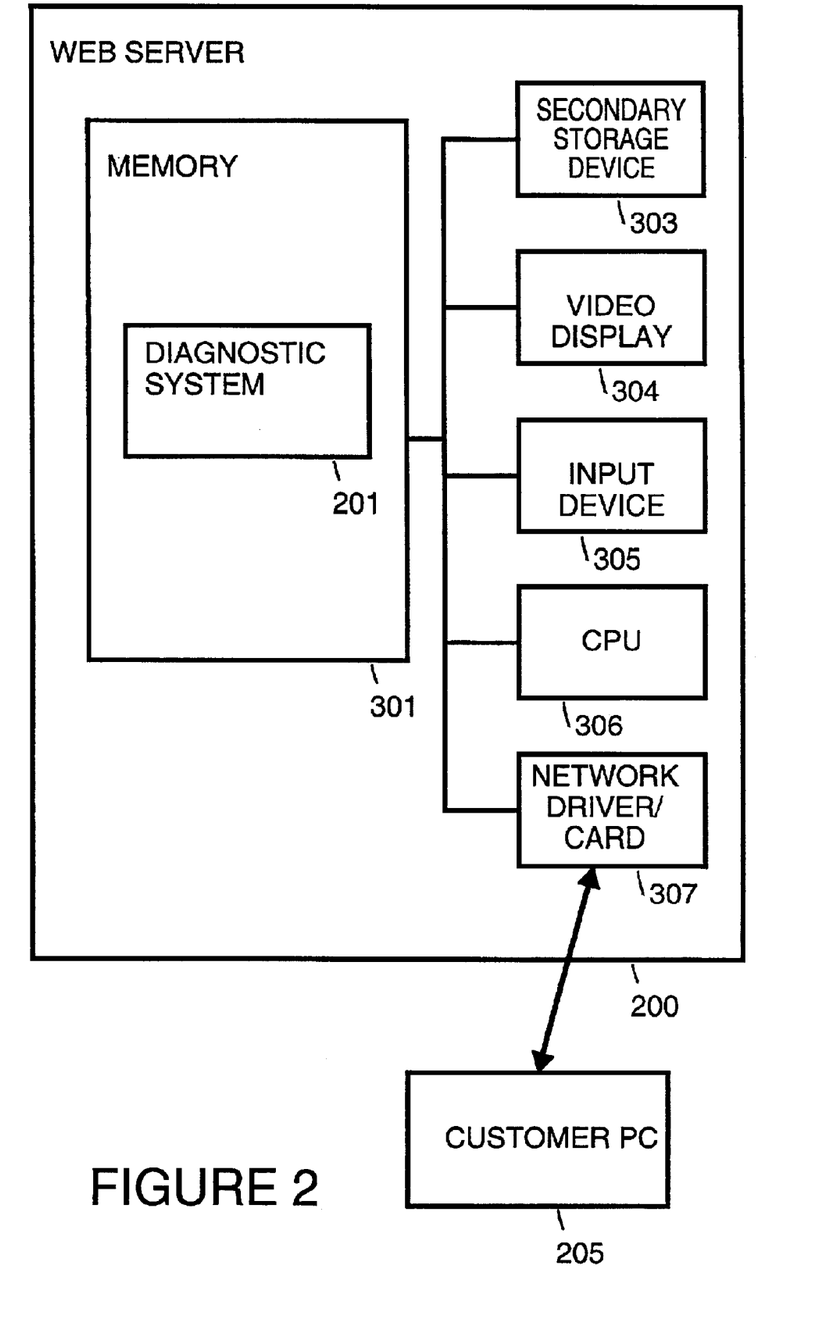
FIG. 2 is a simplified block diagram of a web server.

FIG. 2 is a simplified block diagram of web-server 200. Diagnostic system 201 executes in a memory 301 of web-server 200. Diagnostic system 201 utilizes secondary storage devices 303 for storage of diagnostic models. A video display 304 can be used by a technician to monitor the diagnostic process and to maintain the diagnostic models. Web server 200 also includes an input device 305, such as a keyboard, a CPU 306 and a network card 307 for communication with web-browser 206 in customer PC 205.

Figure 3:
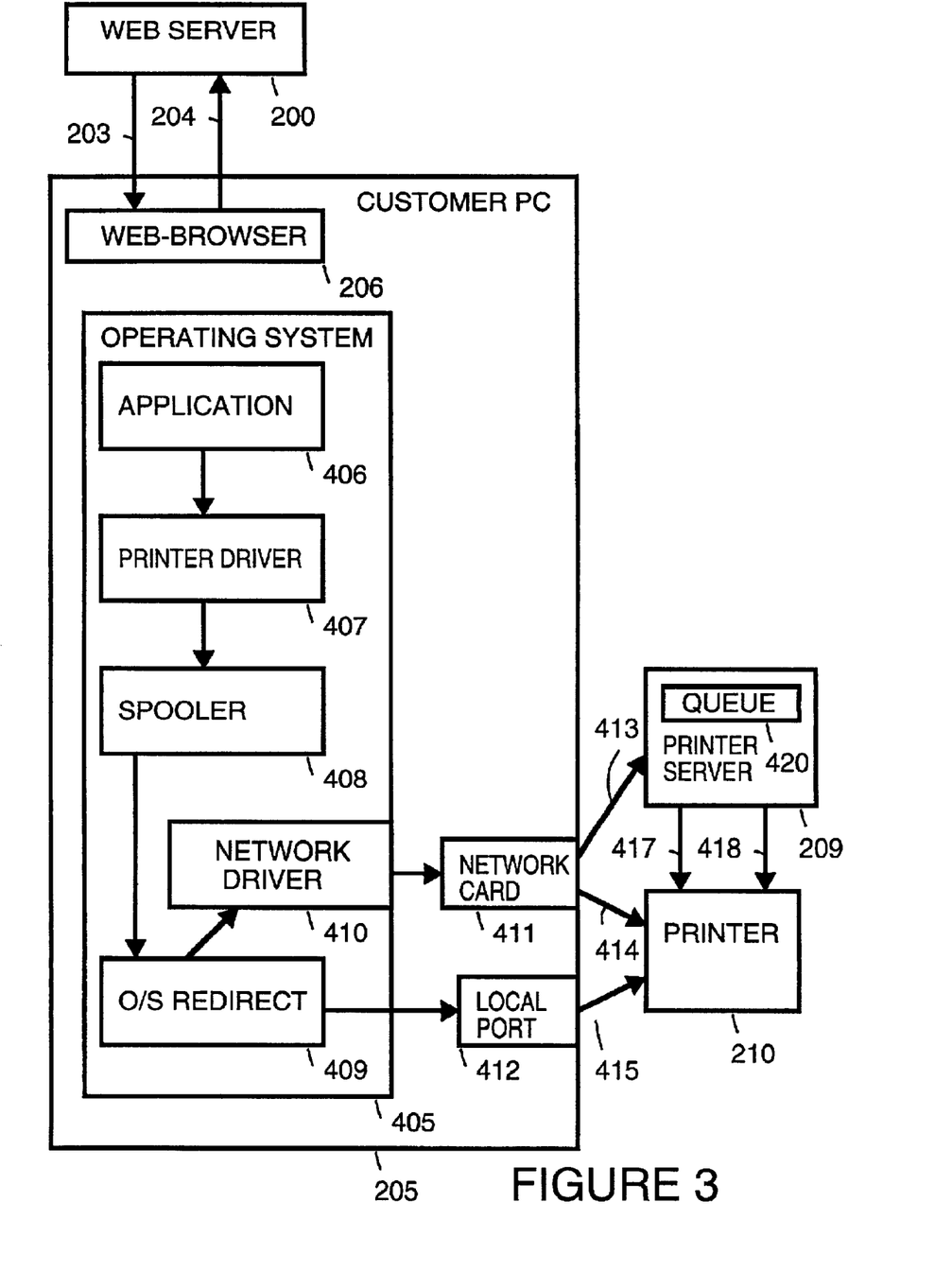
FIG. 3 is a simplified block diagram of components within a customer personal computer used in the diagnostic process.

FIG. 3 is an overview of the components of the diagnostic process. Web-server 200 is shown. The customer communicates with diagnostic system 201 (shown in FIG. 1) within web-server 200 through web-browser 206 running on customer PC 401. The customer receives suggestions 203 from diagnostic system 201 and in return provides answers 204. The customer uses diagnostic system 201 when experiencing a malfunction in the printer system which consists of printer server 209 and printer 210. In general, when a customer attempts to print from an application 406, the print job first goes to a printer driver 407, then through a local spooler 408, if utilized, and then to an operating system (O/S) redirect 409. O/S redirect 409 is the part of the operating system that determines which way the print job goes, i.e., to a network connection 413 via a network driver 410 and a network card 411, or to a local port 412 in the case of a local parallel connected printer. If the print job goes to a local parallel connected printer, the print job goes through a parallel cable 415 before reaching printer 210. If the print job goes to a network printer, it either goes through network connection 413 to printer server 209, or through a direct network connection 414 to printer 210. Direct network connection 414 may be utilized for certain printers, e.g., the HP LaserJet 5Si available from Hewlett-Packard Company, having a business Address of 3000 Hanover Street, Palo Alto, Calif. 94304. When printer 210 is controlled by printer server 209, the print job goes through a printer queue 420 in printer server 209, and then the print job is sent across either a network connection 417 to printer 210, or a parallel cable 418, depending upon how printer 210 is connected to printer server 209.

Application 406, printer driver 407, spooler 408 and O/S redirect 409 all execute in operating system 405 on customer PC 205. When printing a print job from application 406, the print job follows one of the above-described paths on its way to printer 210, depending on the system setup. If anything goes wrong along the way, this can result in no output or unexpected output. Diagnostic system 201 will, through tests on components in the system, attempt to determine which component(s) caused the problem.

An efficient process for gathering the information necessary to construct diagnostic systems based on Bayesian networks, methods for representation of this information in a Bayesian network, and methods for determining optimal sequences of diagnostic steps in diagnostic systems is described by Claus Skaanning, Finn V. Jensen, Uffe Kjaerulff, Paul A. Pelletier, Lasse Rostrup Jensen, Marilyn A. Parker and Janice L. Bogorad in co-pending patent application Ser. No. 09/353,727, filed on Jul. 14, 1999 for AUTOMATED DIAGNOSIS OF PRINTER SYSTEMS USING BAYESIAN NETWORKS (herein "the AUTOMATED DIAGNOSIS patent application"), the subject matter of which is herein incorporated by reference.

An authoring tool that efficiently supports the knowledge acquisition process for diagnostic systems based on Bayesian networks is described by Claus Skaanning in co-pending patent application Ser. No. 09/388,891, filed on Sep. 2, 1999 for AUTHORING TOOL FOR BAYESIAN NETWORK TROUBLESHOOTERS (herein "the AUTHORING TOOL patent application"), the subject matter of which is herein incorporated by reference.

A Bayesian network can have a very simple structure. For example, a single parent node representing cause has child nodes representing actions and questions. Arcs are directed from the parent node towards the child nodes, giving us what is also called a naïve Bayes network because of the simplicity of the structure. The parent node contains a prior probability distribution over the causes. The causes are mutually exclusive since they are represented as states of this node. For actions and questions, we have conditional probability distributions over their answers conditional on the causes. The AUTOMATED DIAGNOSIS patent application and the AUTHORING TOOL patent application describe methods for getting these probabilities from domain experts, and methods for computing good sequences of steps based on this representation.

In the preferred embodiment of the present invention, model selection is performed by Bayesian networks. This allows a domain expert to construct a "supermodel" for model selection using a knowledge acquisition tool which can then be deployed and used as a diagnostic system.

When deployed, the supermodel will ask the user a sequence of questions and based on the answers select the optimal model to handle the users problem. In the preferred embodiment, the supermodel asks the questions in an order that is optimized to lead to identification of the problem as quickly as possible. Once the problem has been identified, a sub model can be deployed to help resolve it. A sub model is a model within the supermodel that is subordinate. When a user supplies answers to questions asked by the supermodel, the supermodel uses these answers to further optimize the sequence of questions.

The sub models can be in multiple levels so that a hierarchy of sub models is formed. In this way the present invention can be used for organizing a hierarchy of sub models to perform, for example, model aggregation or competition between models. The sub models do not have to be Bayesian networks. In the preferred embodiment, the sub models provide the following information:

1) P(M=y|e)—the probability that the model can solve the problem given current evidence
2) C(e)—the cost of the model solving the problem given current evidence
3) The belief in model M being the correct model given the current evidence.

In the preferred embodiment, the passing of control from supermodel to sub model is transparent such that the user does not realize that there is a model selection phase and then a subsequent phase for problem resolution. Instead, the user sees the entire question/answer sequence as one homogenous process.

In the preferred embodiment of the present invention, a sub model passes control back to the supermodel if the sub model discovers that it is unable to solve a problem. The supermodel can then ask additional questions of the user to identify a more suitable sub model to handle the problem.

The preferred embodiment of the present invention thus allows the model selection and problem resolution phases to be integrated into a homogenous process.

Further, the preferred embodiment of the present invention allows the domain expert to construct Bayesian networks for model selection that handle the identification of vague problems such as "Bubble print". The supermodel can ask questions of the user that capture the inherent uncertainty in the identification of these problems—and provide the user with sufficient explanation and visual means to help answer the questions correctly.

Further, the preferred embodiment of the present invention a sub model can be selected even if there remains uncertainty on the correctness of this model. There are many real world situations where a user is unable to select a correct model. These situations should not be handled by selecting an almost random sub model as done by prior methods. In the preferred embodiment of the present invention, these situations are handled by selecting the sub model that is most likely to provide steps in relation to the user's answers to previous questions.

Figure 4:
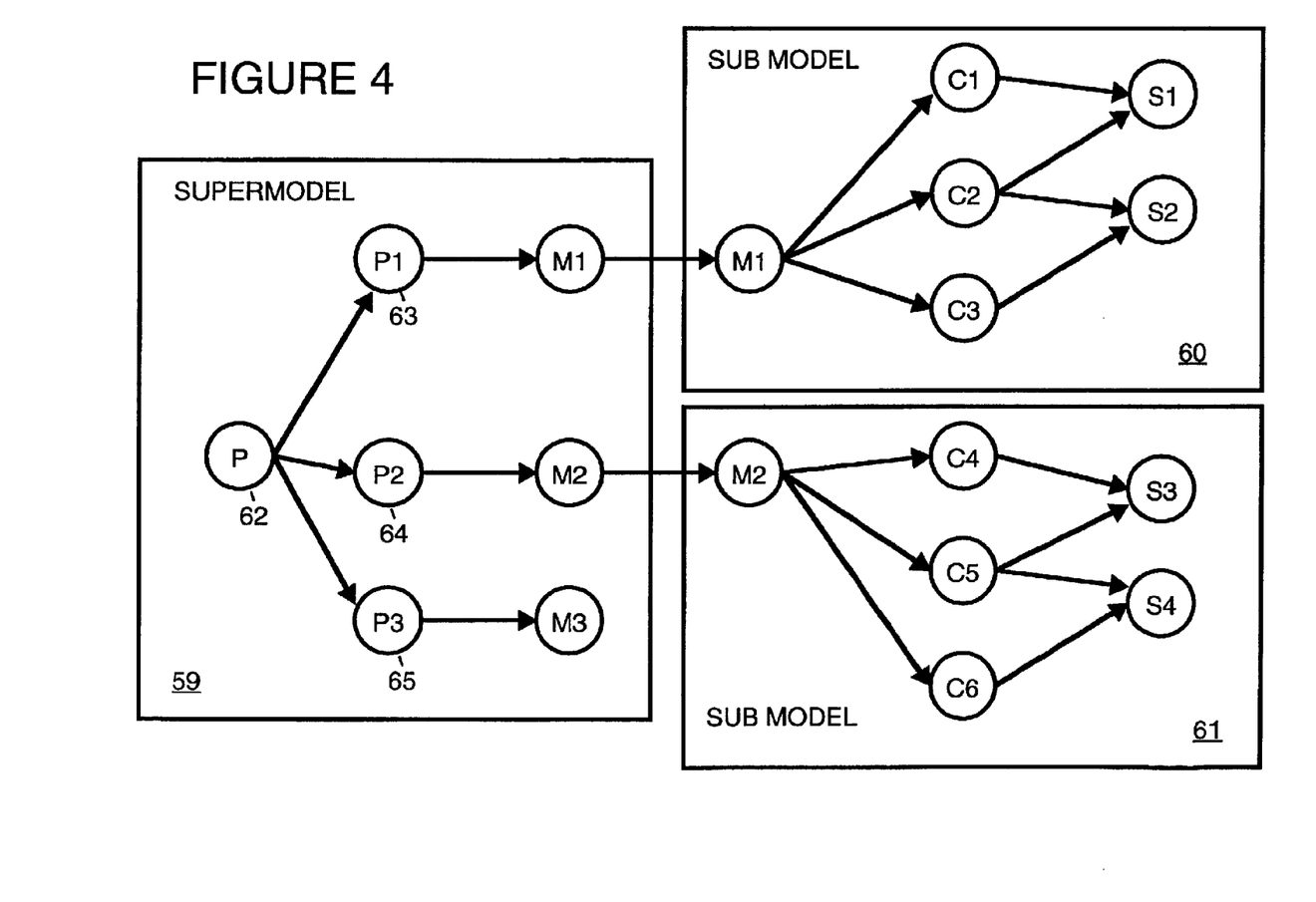
FIG. 4 is a simplified chart representing a supermodel in accordance with a preferred embodiment of the present invention.

FIG. 4 shows a supermodel demarcated by a box 59. A supermodel is a model that helps identify the problem (i.e., issue) and then selects a sub model (also called a child model) that can solve the specific problem. The concept can be generalized to a tree of models with more than two levels of models. Further, the concept can be generalized to enable the control to switch from supermodel to sub model, back again, and then to another sub model.

In FIG. 4, an example situation is shown with an overall problem variable P (i.e., the presenting problem or presenting issue). A problem $P_1$, a problem $P_2$, and a problem $P_3$, are within overall problem variable P. Problem $P_1$, problem $P_2$, and problem $P_3$ are underlying problems (or underlying issues) of presenting problem P. A sub model $M_1$ solves problem $P_1$. A sub model $M_2$ solves problem $P_2$. A sub model $M_3$ solves problem $P_3$.

In FIG. 4, presenting problem P is labeled 62. Underlying problem $P_1$ is labeled 63. Underlying problem $P_2$ is labeled 64. Underlying problem $P_3$ is labeled 65.

Within a box 60, sub model $M_1$ is shown with a cause $C_1$, a cause $C_2$, a cause $C_3$, a step $S_1$, and a step $S_2$. Within a box 61, sub model $M_2$ is shown with a cause $C_4$, a cause $C_5$, a cause $C_6$, a step $S_3$, and a step $S_4$.

As illustrated by FIG. 4, sub models $M_1$, $M_2$ and $M_3$ are not connected in a large Bayesian network but in a hierarchy where beliefs are propagated between the sub models.

In the supermodel shown in FIG. 4, there is a node for each sub model. The node represents the event that the sub model solves the problem. Information is passed from the sub model to the corresponding node in the supermodel as soft evidence. For example, a sub model obtains information by asking a user questions and recording the answers given by the user.

Supermodels are similar to ordinary diagnostic models with the extension that actions can represent sub models. Ordinary step selection algorithms can be used with the model treated as an action. For an action we need two pieces of information to calculate its efficiency; (i) P(A|C), the probability of the action solving the problem given a cause, and (ii) $C_A$, the cost of carrying out the action.

To compute the probability of a sub model M (sub model M is equivalent to, for example, $M_1$, shown in FIG. 1) solving the overall problem given a specific problem P (specific problem P is equivalent to, for example, $P_1$ shown in FIG. 1), the following four pieces of information are combined:

$P_M(M=y)$ : the probability that M will solve the problem computed within the sub model $P_M(M=y|e_M)$ : the probability that M will solve the problem given the evidence $e_M$ in the sub model, computed within the sub model $P_s(M=y|P)$: the probability that M will solve the problem given that P is the problem, specified within the supermodel $e_s$: the evidence within the supermodel, e.g., answers to questions in the supermodel $P_s(M=y|P)$ is elicited by a domain expert when constructing the supermodel. $P_M(M=y)$ and $P_M(M=y|e_M)$ are found by computing the probability that at least one of the actions in the sub model is successful in solving the problem. For example, $P_M(M=y)$ is computed using Equation 1 below:

$$P_M(M = y \mid e_M) = \qquad \text{Equation 1}$$
$$P(\exists A \in M, A = y \mid e_M) = 1 - P(\forall A \in M, A = n \mid e_M) =$$
$$1 - \sum_{C \in M} \left( P(C \mid e_M) \times \prod_{A \in M} P(A = n \mid e_M, C) \right) =$$
$$1 - \sum_{C \in M} \left( P(C \mid e_M) \times \prod_{A \in M} P(A = n \mid C) \right)$$

$P_M(M=y)$ is found prior to starting the diagnostic session, and can be reused in each subsequent step.

Equation 1 is used to compute the probability of at least one of the actions in the sub model solving the problem as one minus the probability of all actions in the model failing. Assuming that the events of actions failing are independent conditional on the cause, the computation can be further factorized and the probability of all actions failing conditional on a specific cause can be computed as the product of the probabilities of the actions failing. Equation 1 can be further simplified to exploit that the probability of an action is independent of all evidence when the cause is given based on the single-fault assumption and the representation of the diagnostic system in a naïve Bayes net. As the probabilities of actions given specific causes can be gathered beforehand, this allows for very efficient computation once new evidence has been obtained. The single-fault assumption requires that exactly one component is malfunctioning and that this component is the cause of the problem.

Equation 1 does not have the probability of questions identifying causes taken into account. The reason for this is that it does not make sense to compute this probability conditional on a cause when the cause is already identified. Equation 1 gives the overall probability that the problem will be solved.

Equation 2 incorporates the probability of the cause getting identified but not necessarily solved in a model with N questions and k actions.

$$P_{M'}(M{=}y|e_M){=}1-P_M(M{=}n,\neg Q_{IDc}^1, \ldots ,\neg$$
$$Q_{IDc}^N|e_M){=}1-P(A_1{=}n, \ldots, A_k{=}n,\neg Q_{IDc}^1, \ldots ,\neg$$
$$Q_{IDc}^N|e_M){=}1-P(A_1{=}n, \ldots, A_k{=}n|e_M){\times}P(\neg Q_{IDc}^1, \ldots ,\neg$$
$$Q_{IDc}^N|A_1{=}n, \ldots, A_k{=}n,e_M){=}1-(1-P_M(M{=}y|e_M)){\times}P(\neg Q_{IDc}^1, \ldots ,$$
$$\neg$$
$$Q_{IDc}^N|A_1{=}n, \ldots ,A_k{=}n,e_M) \qquad \text{Equation 2}$$

When $P_M(M=y|e_M)$ and $P_M(M=y)$ are known, "soft evidence" or likelihood evidence is inserted for the sub model into the node representing the sub model in the supermodel. The soft evidence is used to update the likelihood the sub model will be able to solve the problem. Typically when multiple steps in the sub model have been tried without success, the overall probability that the sub model can solve the problem will drop. This new information needs to be incorporated in the supermodel. To do this, soft evidence is inserted into the node representing the sub model in the supermodel. The soft evidence is stored using the ratio set out in equation 3 below:

$$\frac{P_M(M \mid e_M)}{P_M(M)} \qquad \text{Equation 3}$$

When the soft evidence has been computed for all sub models and inserted into the supermodel, belief propagation is performed in the supermodel. This will result in updated probabilities for both causes and actions taking both evidence in the supermodel ($e_S$) and evidence in the sub models ($e_M$) into account. Within the supermodel and the sub models, evidence is obtained, for example, by recording answers to questions asked of a user.

The cost of a model when considered as an action equals the expected cost of repair, $ECR_M(e)$, (with $e=\{e_S, e_M\}$) for that model, given the current evidence. Both $P_S(M=y|e)$ and $ECR_M(e)$ must be recomputed every time new evidence is inserted in the model.

The preferred embodiment is more efficient when a domain expert is able to specify how causes in the sub model are associated with problems solved by the model in the supermodel.

Figure 5:
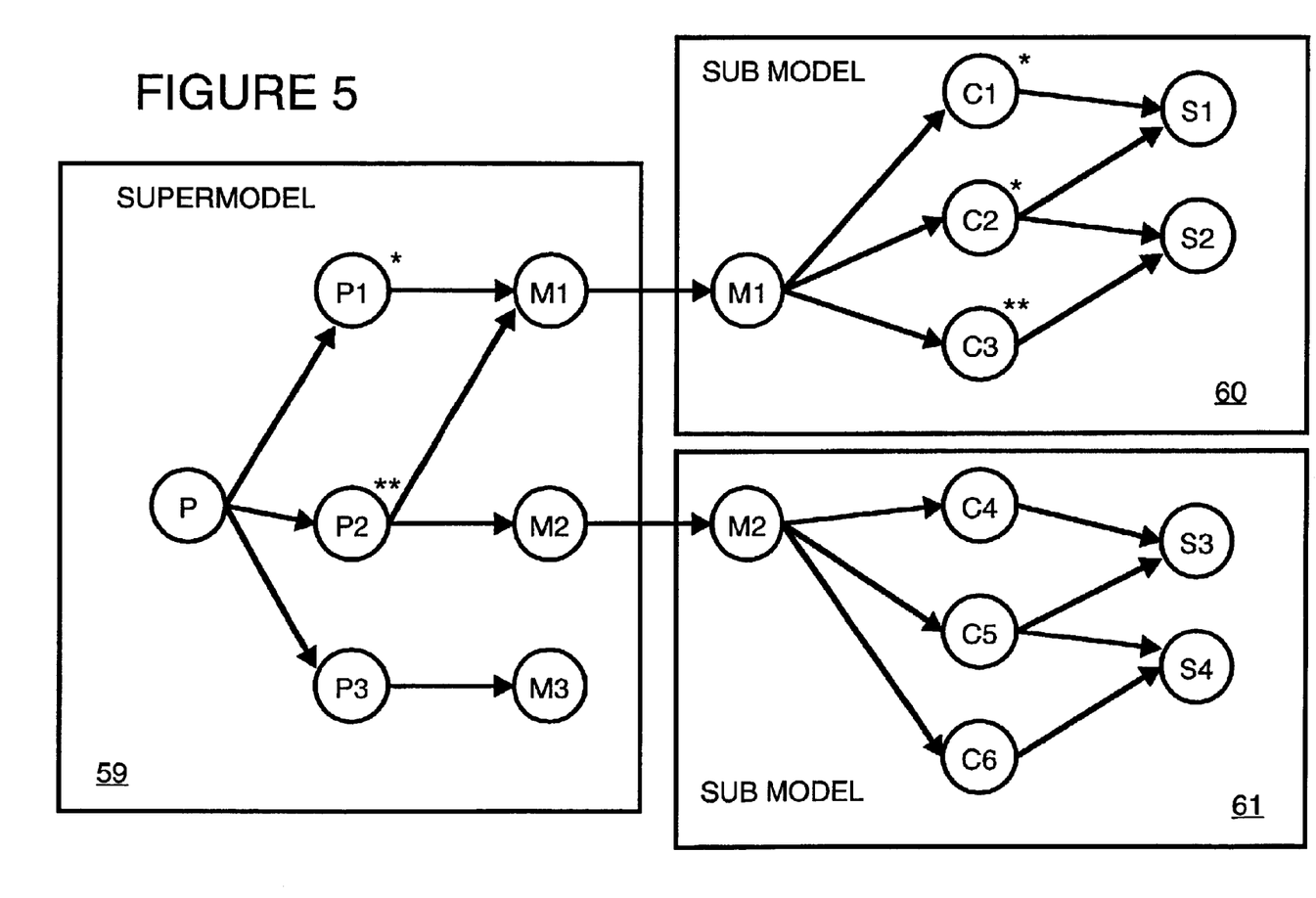
FIG. 5 is a simplified chart representing a supermodel in which a sub model can solve a plurality of problems in a supermodel, in accordance with a preferred embodiment of the present invention.

For example, in FIG. 5, the supermodel shown in FIG. 4 has been modified so that sub model, $M_1$, can solve both problems $P_1$ and $P_2$ in the supermodel. Also, the domain expert has specified how the causes of the sub model $M_1$ are associated with $P_1$ and $P_2$. Specifically, causes $C_1$ and $C_2$ are associated with $P_1$, and cause $C_3$ is associated with $P_2$.

When cause associations are specified, the computation of $P_M(M=y|e_M)$ can be much more precise as only the contributions of actions solving causes associated with P are included.

Utilizing the domain expert's knowledge of associations between causes in sub models and problems in the supermodel should result in a supermodel selection algorithm with greater power. If the domain expert can specify for each cause in a sub model how the sub model is associated with various problems in the supermodel (e.g., 20% with problem P), $P_M(M=y|e_M, P)$ is computed as set out in Equation 4 below:

$$P_M(M = y \mid e_M, P) = \qquad \text{Equation 4}$$
$$1 - \sum_{C \in M, C \sim P} \left( \beta(C, P) \times P(C \mid e_M) \times \prod_{A \in M} P(A = n \mid C) \right),$$

In equation 4, $\beta(C,P)$ is the percentage that cause C is associated with problem P in the supermodel, and C~P means C is associated with P.

Figure 6:
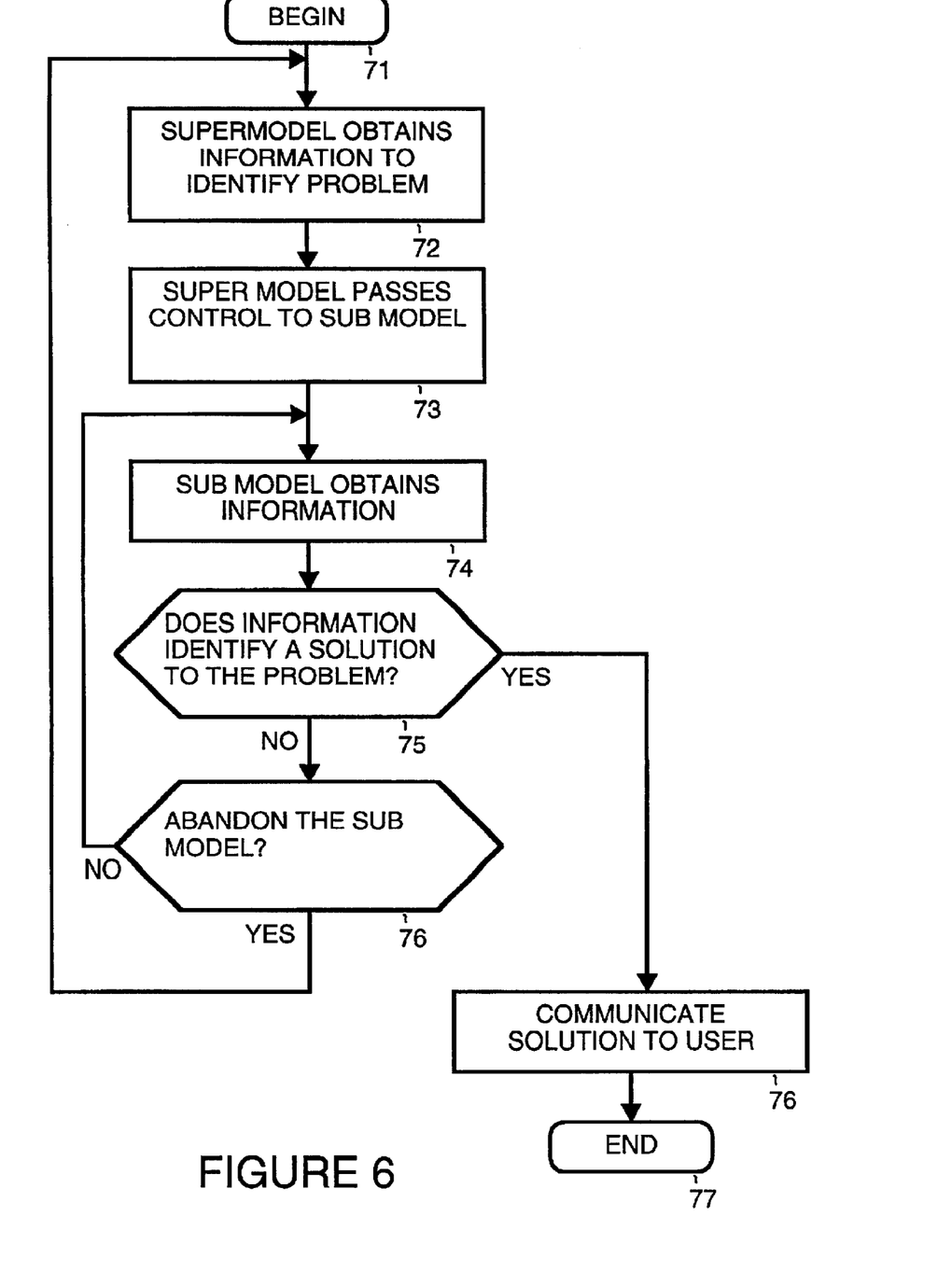
FIG. 6 is a simplified flowchart that illustrates a process by which a supermodel system is used to find a solution to a problem in accordance with a preferred embodiment of the present invention.

FIG. 6 is a simplified flowchart that illustrates a process by which a supermodel system is used to find a solution to a problem. In a step 71 the process being when a user uses the supermodel to perform diagnosis, for example, to solve a presenting problem. In a step 72, the supermodel obtains information to identify an underlying problem of the presenting problem. The supermodel will ask different questions that will help identify the underlying problem. When the supermodel is sufficiently certain it has identified the problem, in a step 73, the supermodel passes the control to the corresponding sub model. For example, the minimum required probability (certainty) before a sub model is selected is specified by the user.

The sub model has control until the sub model either solves the problem or abandon efforts to solve the problem.

In a step 74, the sub model obtains information about the problem, for example by asking the user questions. In a step 75, the sub model determines whether the information is sufficient to identify a solution to the problem. If so, in a step 76 the solution is communicated to the user. For example this is done by the sub model communicating the solution directly to the user or by passing the solution up through the supermodel to the user. In a step 77, the diagnosis is complete.

If in step 75, the sub model determines that the information does not solve the problem, in a step 76, a decision is made as to whether to abandon the sub model. As further described below, depending on the implementation, this decision is made either by the sub model or by the supermodel. If the sub model is not to be abandoned, then in step 74, the sub model obtains additional information.

If in step 76, a decision is made to abandon the sub model, in step 72, the supermodel obtains additional information to identify the problem in order to identify another sub model to continue the process. The supermodel asks new questions to identify the problem, and eventually pass control to another sub model.

There are at least two ways to decide when a sub model should be abandoned and control passed back to the supermodel. The first way is to track the efficiency of the sub model (P/C) in the supermodel and abandon the sub model once the efficiency is no longer the highest. To avoid illogical sequences with too much model switching, an additional cost can be placed on switching models, thus in effect requiring the use of conditional costs in the step selection algorithm. For a discussion on conditional costs, see, Langseth, H., *Conditional cost in the SACSO troubleshooter*, Technical Report, Department of Computer Science, Aalborg University, Denmark (2000).

The second way to decide when a sub model should be abandoned and control passed back to the supermodel is to track the conflict measure internally in the sub model that is in control and abandon the sub model once the conflict measure crosses a certain threshold. This way allows the sub model to independently decide when to give up without consulting the supermodel. However, using state-of-the-art techniques it is very difficult to construct a conflict measure that can distinguish between an unusual case that can be handled by the sub model, and a case that cannot be handled by the sub model.

For an example of a conflict measure, see the Hugin conflict measure suggested by F. V. Jensen, B. Chamberlain, T. Nordahl, and F. Jensen, *Analysis in HUGIN of Data Conflict*, Proceedings of the Sixth Conference on Uncertainty in Artificial Intelligence, 1990.

In the preferred embodiment of the present invention, the identity of steps is maintained such that if evidence is obtained for a step, it is inserted in all other occurrences of this step in other models. This creates a highly dynamic and intelligent system. Also, in the preferred embodiment of the present invention, there cannot be any overlap in causes between models as this would violate the single-fault assumption.

In the preferred embodiment of the present invention, the user is given a high degree of control over the step selection algorithms and model switching. For example, the user is given the ability to specify the minimum required probability (certainty) before a sub model is selected. The user is given the ability to specify that all questions are asked before a sub model is selected. The user is given the ability to specify the cost of calling service. The user is given the ability to specify whether jumping in and out of sub models dynamically is allowed. The user is given the ability to specify the minimum required probability of "Other problem" before a sub model is abandoned. The user is given the ability to specify the additional cost of switching models. And so on.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A computer-implemented method for diagnosing a problem in a product using a Bayesian super model data structure which stores a predetermined set of problems, predetermined criteria for identifying problems in the set, and sub model data problems, predetermined criteria for identifying problems in the set, and sub model data structures including actions for addressing the problems in the set, the method comprising:

receiving user input including criteria for identifying the problem;

comparing the received criteria with the predetermined criteria for identifying problems in the set of the super model data structure;

responsive to a match in criteria within an acceptable margin, selecting the problem from the set associated with the matched criteria;

selecting a sub model data structure storing actions for addressing the selected problem based upon the following predetermined criteria stored in the super model: a probability of the execution of one or more actions stored in the sub model solving the selected problem and a cost of the execution of the one or more actions; and executing one or more actions stored in the sub model.

2. The method of claim 1 wherein selecting a sub model data structure storing actions for addressing the selected problem is based further upon a predetermined measure of belief value in the sub model to address the selected problem, the measure of belief value being stored in the super model data structure.

3. The method of claim 2 wherein the product is a computer printing system.

4. A system for diagnosing a problem in a product comprising:

a memory for storing Bayesian super model data structure including a predetermined set of problems, predetermined criteria for identifying problems in the set, and sub model data structure including actions for addressing the problems in the set;

a user input device for receiving user input including criteria for identifying the problem; and a diagnositic system communicatively coupled to the user input device and having access to the memory storing the super model data structure for comparing the received criteria with the predetermined criteria for identifying problems in the set of the super model data structure, and responsive to a match in criteria within an acceptable margin, selecting the problem from the set associated with the matched criteria, and selecting a sub model data structure storing actions for addressing the selected problem.

5. The system of claim 4 wherein the diagnostic system selects the sub model data structure storing actions based upon the following predetermined criteria stored in the super model: a probability of the execution of one or more actions stored in the sub model solving the selected problem and a cost of the execution of the one or more actions; and executes one or more actions stored in the selected sub model.

6. The system of claim 5 wherein selecting a sub model data structure storing actions for addressing the selected problem is based further upon a predetermined measure of belief value in the sub model to address the selected problem, the measure of belief value being stored in the super model data structure in the memory.

7. The system of claim 4 wherein the product is a computer printing system.

* * * * *